Figure 1:
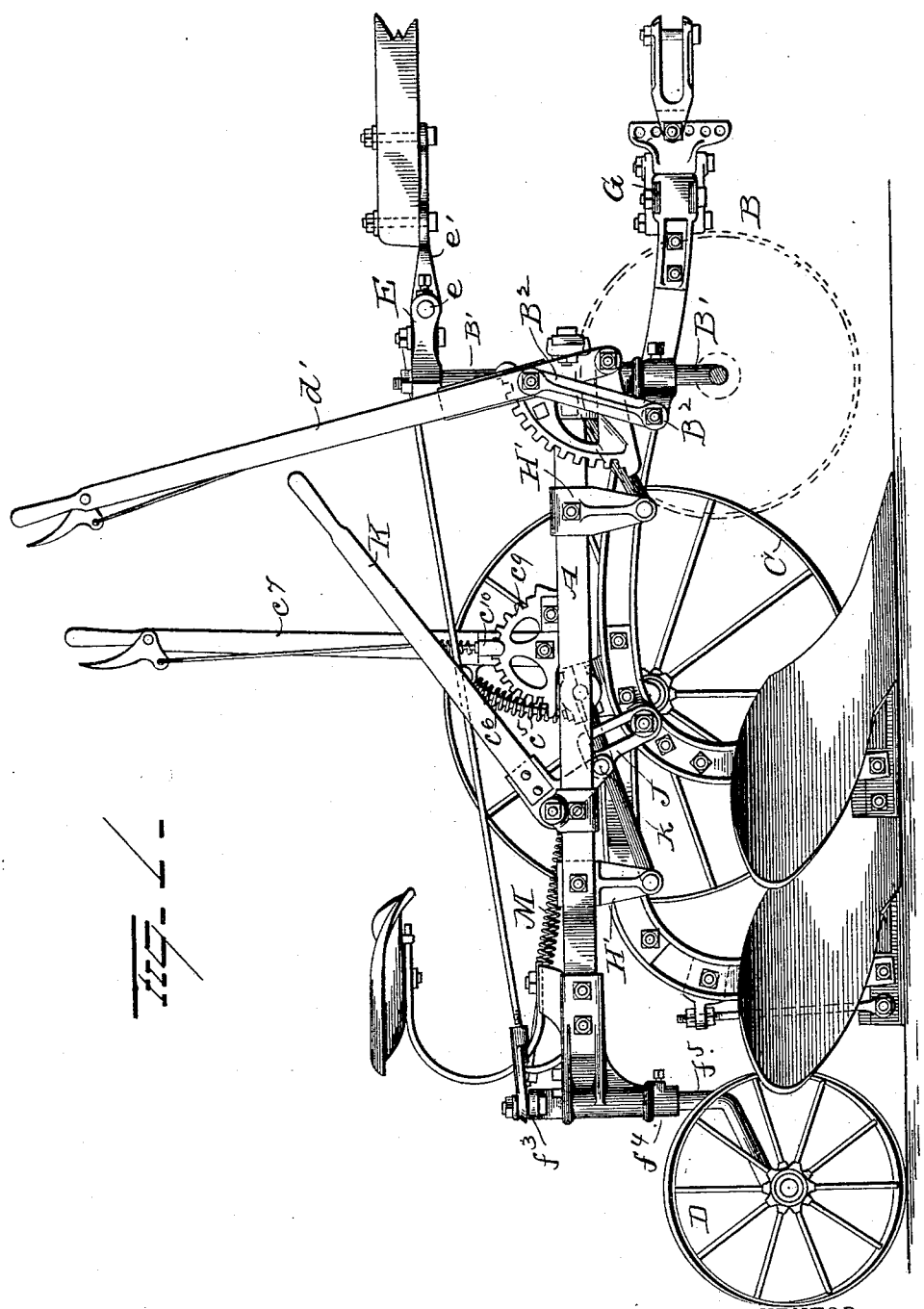

No. 632,647. Patented Sept. 5, 1899.
C. R. DAVIS.
PLOW.
(Application filed May 13, 1899.)
(No Model.) 5 Sheets—Sheet 1.

WITNESSES
E. J. Nottingham
G. F. Downing

INVENTOR
C. R. Davis
By H. G. Seymour
Attorney

No. 632,647. Patented Sept. 5, 1899.
C. R. DAVIS.
PLOW.
(Application filed May 13, 1899.)
(No Model.) 5 Sheets—Sheet 2.
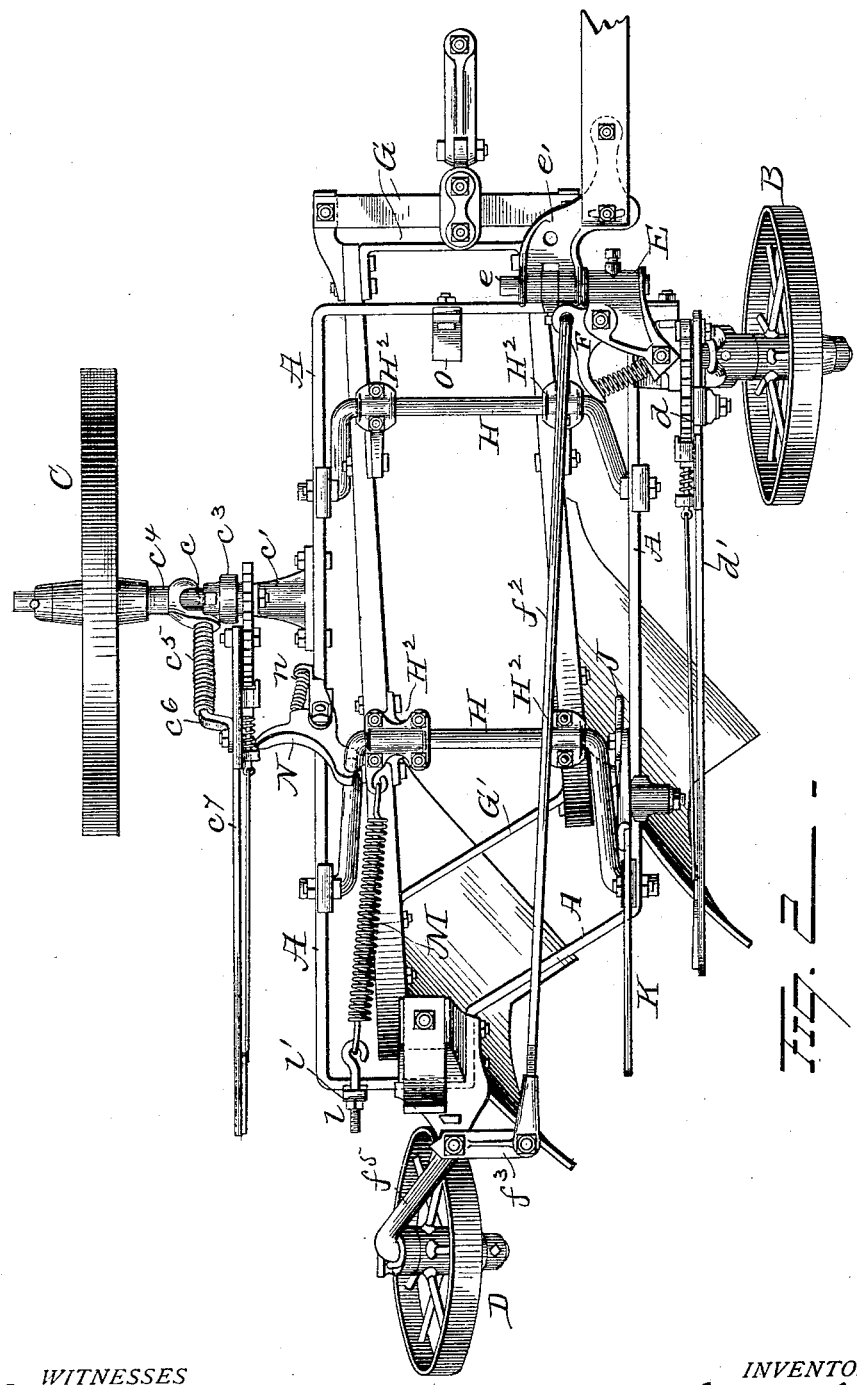
WITNESSES
INVENTOR
C. R. Davis
By H. A. Seymour
Attorney

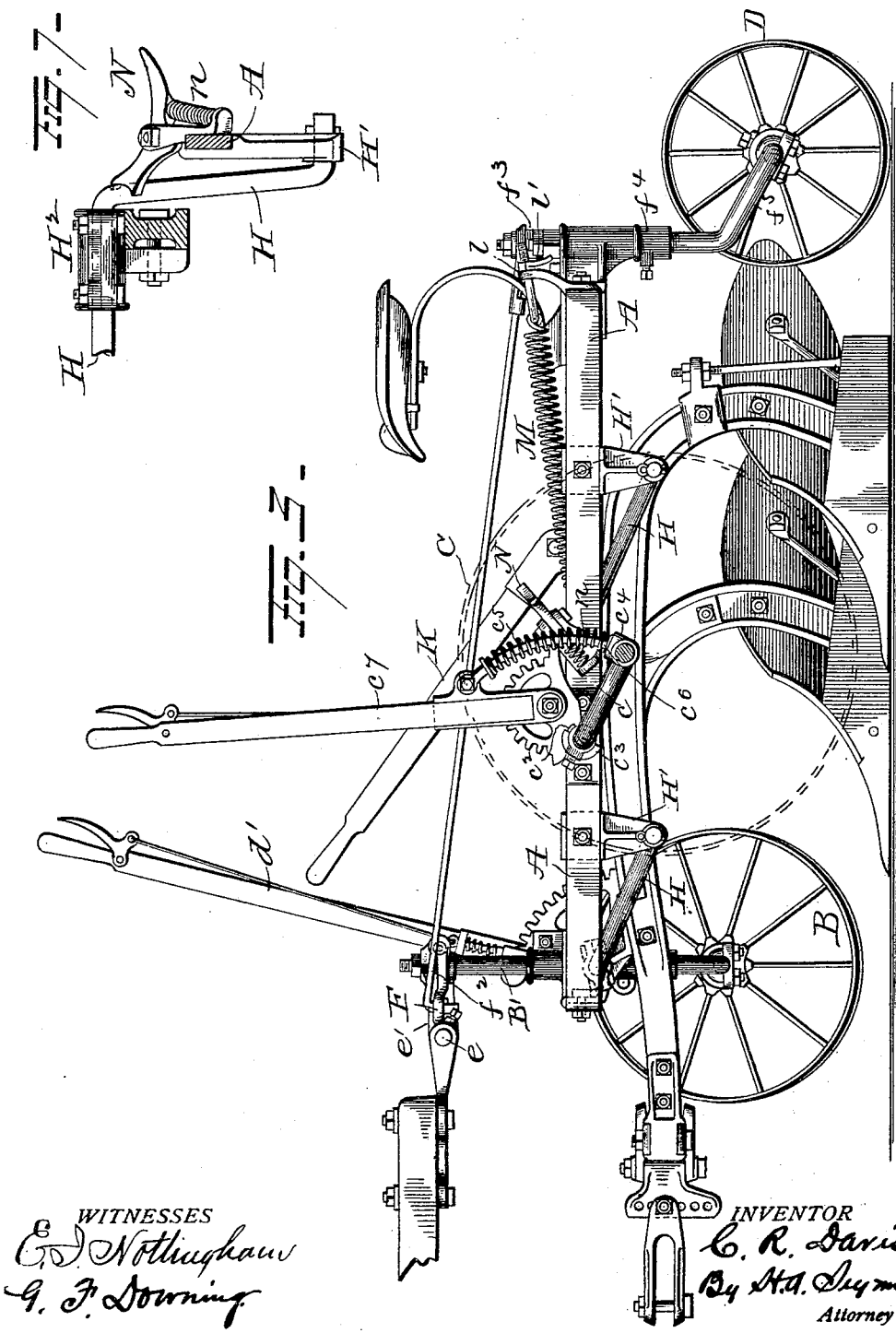

No. 632,647. Patented Sept. 5, 1899.
C. R. DAVIS.
PLOW.
(Application filed May 13, 1899.)
(No Model.) 5 Sheets—Sheet 4.
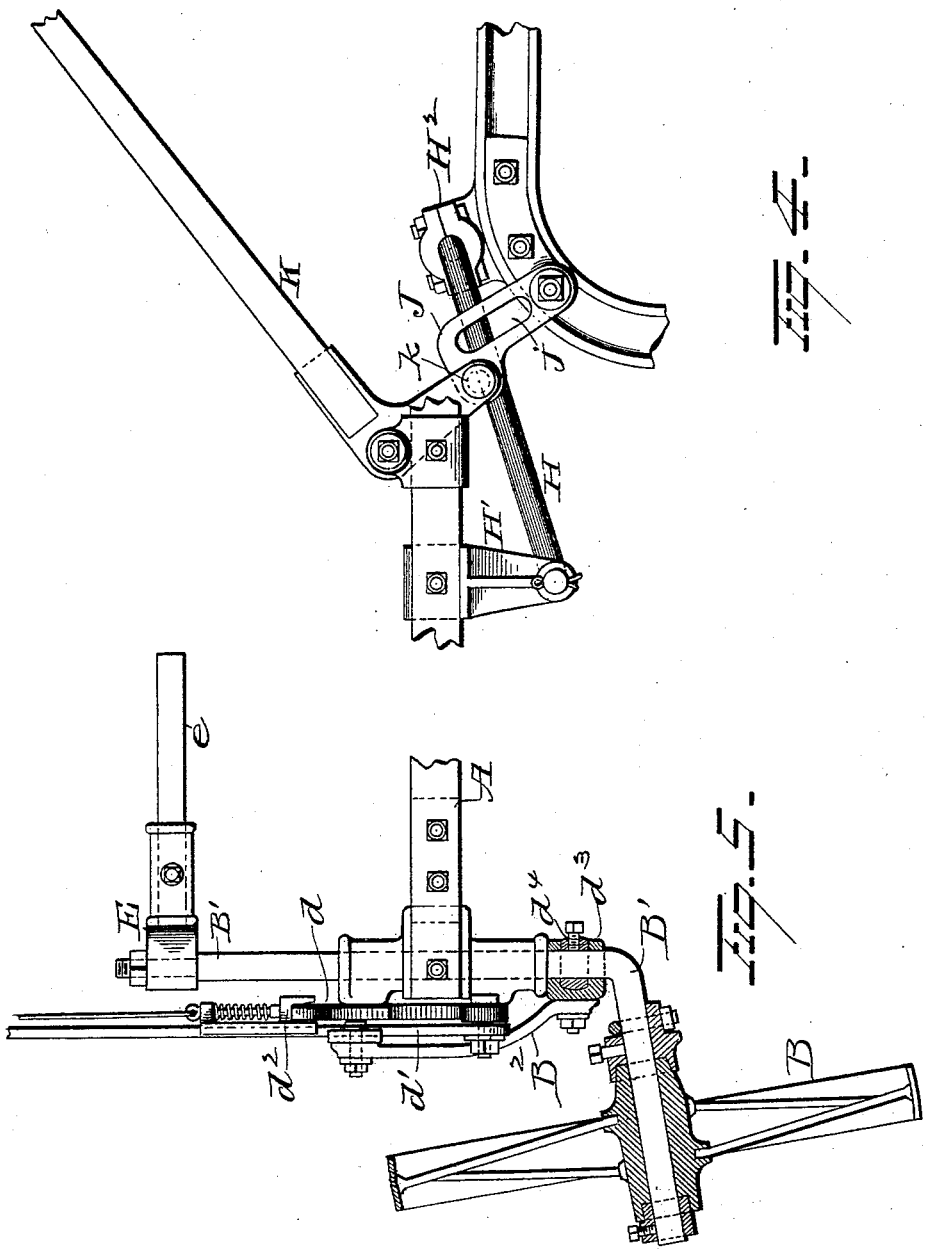
WITNESSES
INVENTOR
C. R. Davis
By H. A. Seymour
Attorney
THE NORRIS PETERS CO., PHOTO-LITHO., WASHINGTON, D. C.

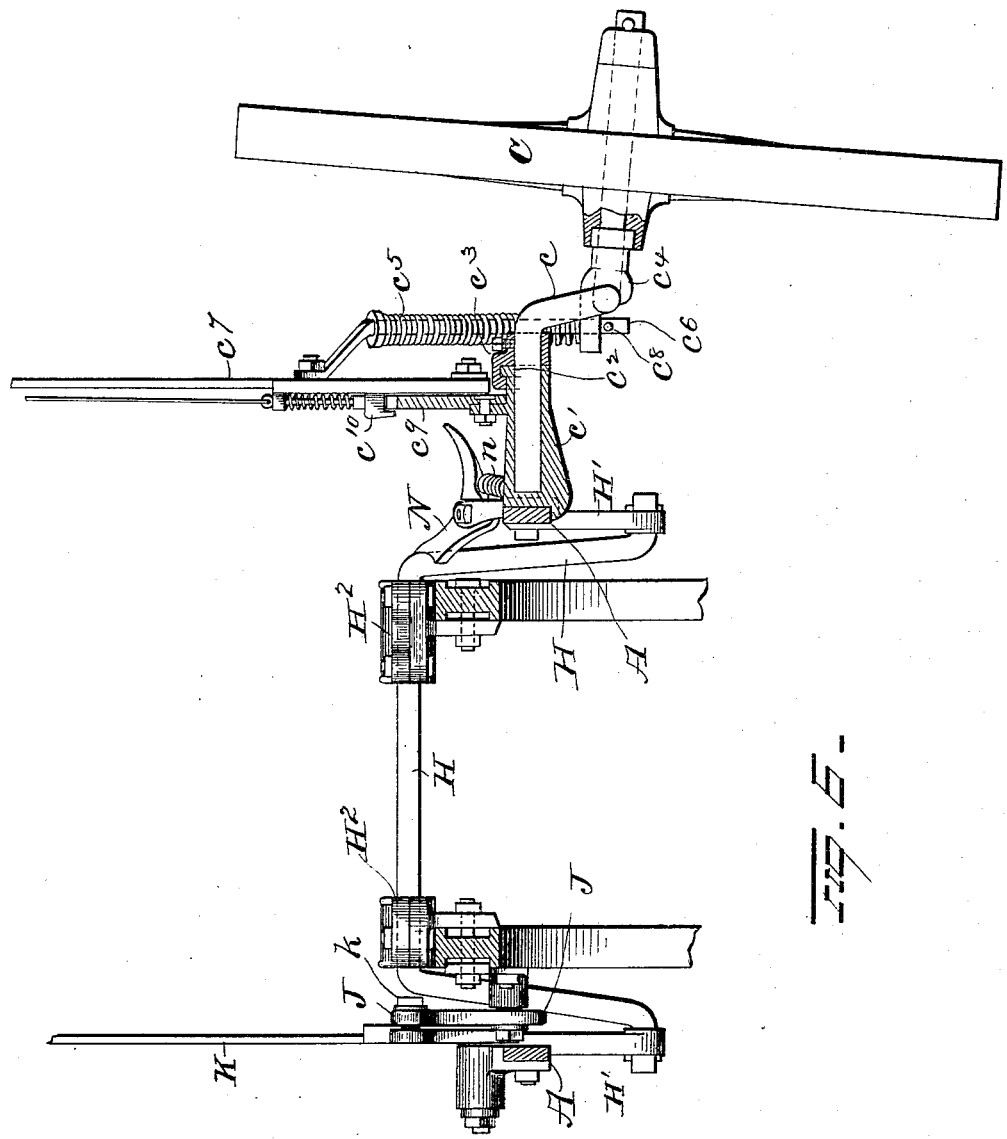

UNITED STATES PATENT OFFICE.

CALVIN R. DAVIS, OF SOUTH BEND, INDIANA, ASSIGNOR TO THE SOUTH BEND IRON WORKS, OF SAME PLACE.

PLOW.

SPECIFICATION forming part of Letters Patent No. 632,647, dated September 5, 1899.

Application filed May 13, 1899. Serial No. 716,662. (No model.)

*To all whom it may concern:*

Be it known that I, CALVIN R. DAVIS, of South Bend, in the county of St. Joseph and State of Indiana, have invented certain new and useful Improvements in Plows; and I do hereby declare the following to be a full, clear, and exact description of the invention, such as will enable others skilled in the art to which it appertains to make and use the same.

My invention relates to an improvement in plows, and more particularly to sulky and gang plows; and it consists in the parts and combinations of parts, as will be more fully described, and pointed out in the claims.

In the accompanying drawings, Figure 1 is a view in side elevation taken from the furrow side. Fig. 2 is a plan view. Fig. 3 is a view in side elevation from the land side. Fig. 4 is a detached view of the lever and mechanism for elevating the plow-frame and for locking it when in its lowered position. Fig. 5 is a view in section through the furrow-wheel axle, showing the manner of connecting the furrow-wheel elevating and lowering lever thereto. Fig. 6 is a view in section through the land-wheel axle, showing the manner of connecting it to the plow-frame; and Fig. 7 is a view of the device for holding the plow-frame elevated.

A represents the frame, approximately rectangular in shape. The rear end of this frame on the furrow side instead of being at right angles, and thus forming a perfect rectangle, is bent or inclined rearwardly to a point over the moldboard of the rear plow and then straight back to the rear cross-bar of the frame, as clearly shown in the drawings. This frame is supported at its front end on the furrow side by the furrow-wheel B, on the land side, at a point preferably in advance of its center, by the land-wheel C, and at its rear end by the caster-wheel D, any or all of which may be of the usual form or construction. The land-wheel C is supported on a crank-axle $c$, one end of which movably rests in the hollow bracket $c'$, secured to the frame A, while the other end carries the land-wheel C. The bracket $c'$, carrying one end of the crank-axle $c$, is provided near its outer end and on its upper side with a rib $c^2$, which latter rests within a groove in the collar $c^3$, secured by a clamping-screw or other means to the crank-axle $c$. The flange or rib $c^2$ extends through a radius of less than a half-circle, so that upon turning the axle half-way around the grooved collar is freed from the rib $c^2$ on the bracket $c'$, thus permitting the axle, with the land-wheel thereon, to be removed or attached to the frame without removing, loosening, or tightening any bolts or screws, thus enabling the parts to be readily and quickly assembled or taken apart, as necessity demands.

Secured to the axle-spindle, to the inside of the land-wheel, is the sleeve $c^4$, which latter is bifurcated at its rear end to receive the lower portion of the upright or intermediate member of the crank-axle $c$. The rear member of the bifurcated end of the sleeve $c^4$ is provided with a seat for the lower end of the coiled spring $c^5$ and with an opening for the passage of the curved rod $c^6$, one end of which is pivoted to the hand-lever $c^7$. This rod passes through the spring $c^5$ and is secured against withdrawal from the sleeve by the cotter-pin $c^8$. From this construction it will be seen that the ground-wheel is yieldingly held to the ground, thus permitting it to yield or give while passing over obstructions without sudden shock and without unduly elevating the frame A.

The lever $c^7$ is pivoted to the toothed segment $c^9$, secured to the bracket $c'$, and is provided with a spring-actuated detent $c^{10}$, adapted to engage the teeth on the segment and lock the lever in place. With this construction it will be seen that by moving the hand-lever $c^7$ the axle will be turned to elevate or lower the frame.

The axle B', carrying the furrow-wheel B, is approximately L shape, its vertical arm being supported in the bearing E, secured to the forward end of frame A on the furrow side thereof. This bearing carries the toothed segment $d$, to which latter is pivotally secured the lever $d'$, carrying the spring-actuated detent $d^2$, adapted to engage the teeth on the segment and lock the lever in place. This lever carries the pitman B², the lower end of which is pivotally secured to the bracket $d^3$, loosely mounted on the axle B', and the bracket is recessed centrally and provided on its side with a slot for the reception of the set-screw for securing collar $d^4$ in place. This collar is secured to the vertical member of the axle B' and rests within the recess, and hence can be adjusted on the axle without disconnecting any parts of the machine. From this it will be seen that the axle is free to turn in the bracket and that the collar on the axle forms a seat for the bracket. Hence by simply elevating the lever the forward end of the furrow side of frame A is depressed, and by depressing the lever the said end of the frame is elevated.

Secured to the upper squared end of shaft B' is the tongue-arm E, carrying the pin $e$, on which the tongue-plate $e'$ is journaled. This pin $e$ is removably secured in place by a setscrew, and the tongue-plate $e'$ is journaled on said pin. When the tongue is turned by the team, the axle B' and furrow-wheel thereon are turned in the proper direction.

Pivotally secured to the shaft-arm E is the bell-crank lever F. The rear end of this lever bears against the spring $f$, while the front end carries the front end of the pitman-rod $f^2$. This pitman-rod $f^2$ extends rearwardly above and lengthwise the frame A and is pivotally secured at its rear end to the outer end of arm $f^3$, rigidly secured to the upper end of the caster-wheel axle $f^5$, which latter is mounted in a box or bearing secured to the rear end of frame A, the frame being supported on collar $f^4$, rigidly secured to the axle. The spring $f$ is quite stiff. Hence in the ordinary or first portion of the turning movement of the tongue there is practically no compression of the spring $f$, and as the bell-crank lever F is pivoted to and moves with the arm E it follows that the caster-wheel turns with the furrow-wheel. After the axle of the caster-wheel has been turned part way around a continued lateral movement of the tongue compresses the spring $f$, thus permitting the furrow-wheel axle to be still further turned until the furrow-wheel casters are in line with the land and caster wheels for making the shortest possible turn, thereby avoiding any cramping or sliding of the wheels, which has been of great annoyance in plows as heretofore constructed. Again, the spring serves as a cushion for the caster-rod, thus reducing the side lash on the pole and the consequent jar to the horses' necks.

The plow or plows, as the case may be, are carried and supported by the frame A. While I may and have used the inventions here described on a single sulky-plow, I have illustrated the improvements in connection with a gang-plow. The plow-beams are connected at their front ends by suitable spacing-bars G, secured to the ends of the beams, and are connected at their rear ends by the brace G', secured to the inner sides of the beams, thus firmly securing the plows together. The gang thus constructed is secured to the frame A by the two bails or crank-shafts H, each of which is journaled at its ends in boxes H', depending from the frame A. These crank-shafts incline forwardly and upwardly and carry the boxes H², secured to the plow-beams. Two boxes are secured to each beam, and as the two beams are each suspended from the two crank-shafts it follows that the shafts and beams move in unison. Pivotally secured to the beam on the furrow side of the frame is the link J, provided with an elongated slot $j$ and also at its upper end with a hole for the passage of the wrist-pin $k$ on the lever K. This lever K, which is of the bell-crank variety, is journaled to the frame A and is provided at its shorter end with the wrist-pin $k$, which latter, as before stated, passes through the opening in the upper end of the link J. This lever K elevates or depresses the gang of plows, and from the construction it will be seen that by throwing the lever forward until the pivotal point of the lever and link passes the center the gang is locked in its depressed position, and consequently is held down to its work.

When working in stony ground or in soil where it is advisable to have the plow or gang free to rise upon meeting an obstruction, the wrist-pin may be passed through the slot $j$ in the link J, and thus leave the gang free to rise upon contact with any obstruction. This can be accomplished by removing the nut from the end of wrist-pin, withdrawing the latter from the hole, passing it through the slot, and securing it by the nut. With the lever secured to the link in either way it will be seen that by moving the lever forwardly the gang is lowered and by moving it rearwardly the gang is elevated.

Secured to the rear end of the frame A by means of a screw-bolt $l$, having an adjusting-nut $l'$ thereon, is the spring M, the forward end of which is attached to one of the boxes or bearings H², carrying a plow-beam. This spring not only tends to elevate the plows, but it also causes them to fall gradually and take the ground easily and without shock when the plows are released by unlatching the combined foot-rest and latch N. This combined rest and latch is in the form of a bell-crank lever and is pivoted centrally to the frame A and notched at its inner end to engage the rear crank-shaft or bail H, carrying the plows. This lever is maintained in its position to engage the shaft by the spring $n$. Hence it will be seen that as the plows are elevated by the lifting-lever this latch engages the rear shaft or bail and prevents the descent of the plows when the lever is released. To release the plows, so that they may descend, the driver, who sits with one foot resting on the combined rest and latch, simply gives the combined rest and latch a push or sharp kick, which disengages it from the crank-shaft and leaves the plows free to descend and take the ground automatically without the handling of levers, thus leaving the operator's hands free for the control of the team, which feature is specially advantageous in turning corners. When the plows are in the ground, the front crank-shaft, connecting the plow-beams, rests on the stirrup O, secured to the frame A, and limits the descent of the forward end of the gang.

In the operation of the device the parts are first adjusted to cut the required depth by lowering the frame A on the land and furrow wheels, and then by releasing the combined foot-rest and latch the plows will plunge forwardly against the action of the spring and assisted by the pull of the team and take the ground to the required depth, and if the plow-elevating lever be attached by its wrist-pin to the hole in the link the plows will be locked, whereas if the wrist-pin be passed through the slot in the link the plows will be free to yield upon meeting an obstruction. To elevate the plows, the operator or driver simply pulls backwardly on the lifting-lever, and when the gang has reached its normal position it is automatically engaged and held elevated by the combined foot-rest and latch. By interposing a spring between the pitman connecting the furrow-wheel and caster-wheel a yielding connection is thus formed which absorbs all sudden jars and shocks and which permits a continued or additional movement of the furrow-wheel axle after the caster-wheel axle has come to a rest, thus permitting the furrow-wheel to caster with the land and caster wheels, and thus make the turn in the smallest possible space without causing a sliding or undue lateral strain on any of the wheels.

It is evident that many slight changes might be made in the relative arrangement of parts herein shown and described without departing from the spirit and scope of my invention. Hence I would have it understood that I do not wish to restrict myself to the exact construction and arrangement of parts herein shown and described; but, Having fully described my invention, what I claim as new, and desire to secure by Letters Patent, is—

1. The combination with a frame mounted on wheels, of a plow, bails or crank-shafts carried by said frame and supporting the plow and a combined foot-rest and latch adapted to engage one of the bails for sustaining the plow in its elevated position.

2. The combination with a frame mounted on wheels, of a plow, bails or crank-shafts carried by said frame and supporting the plow, and a spring-actuated foot-rest and latch adapted to engage one of the bails for sustaining the plow in an elevated position.

3. The combination with a frame mounted on wheels, of a plurality of connected plows, bails or crank-shafts carried by said frame and supporting the plows, a lever for elevating the plows and a combined foot-rest and latch adapted to engage one of the bails for sustaining the plows in an elevated position.

4. The combination with a frame mounted on wheels, of a plurality of connected plows, bails or crank-shafts carried by said frame and supporting the plows, a spring tending to elevate the plows, a lever for elevating the plows and a combined foot-rest and latch adapted to engage one of the bails for holding said plows in their elevated positions.

5. The combination with a frame mounted on wheels, of a plow, bails or crank-shafts carried by said frame and supporting the plow, and a spring-actuated foot-rest and latch pivoted to the frame and adapted to engage one of the bails or crank-shafts for holding the plow elevated.

6. The combination with a frame, of a journal-box secured to said frame and provided with a flange, the land-wheel axle loosely mounted in said box, and a collar secured to the axle and provided with a groove adapted to receive the flange on the box.

7. The combination with a frame, of a journal-box secured to said frame, and provided with a flange formed in the arc of a circle, the land-wheel axle mounted in said box, a collar rigidly secured to the axle and having a groove adapted to receive the flange on the box, the said flange and groove being somewhat less than a half-circle so that by turning the axle part way around in its bearing it can be withdrawn therefrom.

8. The combination with a frame, of a journal-box secured thereto and provided with an integral curved flange, the land-wheel axle mounted in said box, a collar rigidly secured to the axle and having a groove adapted to receive the flange on the box and a lever pivoted to the box and connected to the axle for turning the latter in its bearing or box.

9. The combination with a frame, of a journal-box secured thereto and provided with an integral curved flange, the land-side axle journaled in said box, a collar rigidly secured to said axle and provided with a groove to receive the flange on the box, a sleeve on the axle-spindle, a spring seated on said sleeve, a lever pivoted to the journal-box and having a curved rod passing longitudinally through the spring and spring-seat and a toothed segment and spring-detent for locking the lever in place.

10. The combination with a frame, an L-shaped axle, a box in which said axle is vertically movable and means for moving said axle vertically, of a tongue-arm secured to the upper end of said axle, a tongue-plate pivoted to said arm, a bell-crank lever carried by the arm, a spring interposed between one end of said lever and arm, a caster-wheel and a pitman connecting the other end of said bell-crank lever and caster-wheel axle, substantially as set forth.

11. The combination with a frame, a furrow-wheel axle, and a tongue-arm secured to said axle, of a lever pivoted to said arm, a spring interposed between one end of said lever and the arm, a caster-wheel axle and a pitman connecting the other end of said lever and the caster-wheel axle.

In testimony whereof I have signed this specification in the presence of two subscribing witnesses.

CALVIN R. DAVIS.

Witnesses:
F. C. NIPPOLD,
EDWIN NICAR.